United States Patent
Kim et al.

(10) Patent No.: US 11,016,443 B2
(45) Date of Patent: May 25, 2021

(54) HOLOGRAPHIC RECONSTRUCTION APPARATUS AND METHOD

(71) Applicant: NAEILHAE, CO. LTD., Seongnam-si (KR)

(72) Inventors: Byung Mok Kim, Seoul (KR); Mal Eum Sung, Seoul (KR); Seong Jin Park, Seoul (KR); Sang Jin Lee, Seoul (KR)

(73) Assignee: NAEILHAE, CO. LTD., Seongnam-si (KR)

( * ) Notice: Subject to any disclaimer, the term of this patent is extended or adjusted under 35 U.S.C. 154(b) by 416 days.

(21) Appl. No.: 16/082,690

(22) PCT Filed: Oct. 20, 2017

(86) PCT No.: PCT/KR2017/011642
§ 371 (c)(1),
(2) Date: Sep. 6, 2018

(87) PCT Pub. No.: WO2019/078384
PCT Pub. Date: May 25, 2019

(65) Prior Publication Data
US 2020/0310349 A1    Oct. 1, 2020

(51) Int. Cl.
   *G03H 1/22*           (2006.01)
   *G03H 1/04*           (2006.01)

(52) U.S. Cl.
   CPC .......... *G03H 1/2205* (2013.01); *G03H 1/0402* (2013.01)

(58) Field of Classification Search
   CPC ...... G03H 1/2205; G03H 1/0402; G03H 1/22; G03H 1/2202; G03H 1/04; G03H 1/0406;
(Continued)

(56) References Cited

U.S. PATENT DOCUMENTS

| 6,597,642 B1 | 7/2003 | Ijima et al. |
| 7,649,160 B2 | 1/2010 | Colomb et al. |

(Continued)

FOREIGN PATENT DOCUMENTS

| CN | 101576731 B | 12/2010 |
| CN | 101727059 B | 11/2011 |

(Continued)

OTHER PUBLICATIONS

International Search Report (Forms PCT/ISA/210 and PCT/ISA/237) dated Aug. 14, 2018, by the Korean Intellectual Property Office in corresponding International Application No. PCT/KR2017/011642. (11 pages).

*Primary Examiner* — Derek S. Chapel
*Assistant Examiner* — Adam W Booher
(74) *Attorney, Agent, or Firm* — Buchanan Ingersoll & Rooney PC

(57) ABSTRACT

Provided are an improved holographic reconstruction apparatus and method.

A holographic reconstruction method includes: obtaining an object hologram of a measurement target object; generating a digital reference hologram calculated from the obtained object hologram; extracting each of a first phase information of the object hologram and a second phase information of the calculated digital reference hologram; calculating a phase information difference from the first phase information of the object hologram and the second phase information of the calculated digital reference hologram; and compensating for distorted phase information based on the calculated phase information difference, and calculating quantitative thickness information of the measurement target object by using the compensated distorted phase infor- (Continued)

mation to reconstruct 3-dimensional (3D) shape information and quantitative thickness information of the measurement target object.

15 Claims, 7 Drawing Sheets

(58) Field of Classification Search
CPC .......... G03H 1/0443; G03H 2001/221; G03H 2001/2223; G03H 2001/2226–2234; G03H 2001/0413–0417; G03H 2001/0428; G03H 2001/0441; G03H 2001/045; G03H 2001/0454–0458; G02B 5/32

See application file for complete search history.

(56) References Cited

U.S. PATENT DOCUMENTS

| 2009/0073521 | A1 | 3/2009 | Coppola et al. |
| 2020/0146545 | A1* | 5/2020 | Kumar ............... G01B 9/02091 |

FOREIGN PATENT DOCUMENTS

| KR | 10-0674731 B1 | 1/2007 |
| KR | 1020100095302 A | 8/2010 |
| KR | 1020120014355 A | 2/2012 |
| KR | 101139178 B | 4/2012 |
| KR | 101441245 B1 | 9/2014 |
| KR | 10-1605178 B1 | 3/2016 |
| KR | 1020160029606 A | 3/2016 |
| KR | 10-2017-0120462 A | 10/2017 |

* cited by examiner

HOLOGRAPHIC RECONSTRUCTION APPARATUS AND METHOD

TECHNICAL FIELD

The present disclosure relates to an improved holographic reconstruction apparatus and method.

More particularly, the present disclosure relates to an improved holographic reconstruction apparatus and method, which are capable of being applied to defect-detecting apparatuses having a ultrafine structure, such as a thin-film transistor (TFT) and a semiconductor, medical devices that need to display a precise 3-dimensional (3D) image, and other detecting, determining, or displaying apparatuses in various fields including refractive index error detection of a transparent object, such as a lens, since the improved holographic reconstruction apparatus and method reconstructs 3D shape information and quantitative thickness information of an object by obtaining only one object hologram, digitally calculating and generating a reference hologram from the obtained object hologram, extracting an object phase of the object hologram and an object phase of the reference hologram, and calculating a difference between the object phases. Thus, the apparatus and method may be used to solve issues related to a complex structure of an optical apparatus required during conventional one-shot-type digital holography reconstruction using one object hologram and consequent high costs, and to perform holographic reconstruction using a simple structure and at a low cost, and have general versatility of being applied to both conventional reflective and transmissive hologram reconstruction apparatuses of the related art, and in particular, do not require reference light during hologram reconstruction, and are able to reconstruct a quantitative 3D image of a measurement target object in real time.

BACKGROUND ART

A digital holographic microscope is a microscope that measures a shape of an object by using digital holography technology.

A general microscope is an apparatus for measuring a shape of an object by measuring intensity of light reflected from or passed through the object when a general ordinary light source illustrates the object, whereas a digital holographic microscope is an apparatus for reconstructing shape information of an object based on information that is obtained by measuring and recording, in a digital manner, interference and diffraction phenomena of light occurring when the light illuminates the object.

In other words, in digital holographic technology, light of a single-wavelength, such as a laser beam, is generated, the light is split into two lights by using a beam splitter, wherein one light (referred to as reference light) directly illustrates an image sensor while the other light illustrates a measurement target object and light (referred to as object light) reflected from the measurement target object illustrates the image sensor. At this time, an interference phenomenon between the reference light and the object light occurs in the image sensor, and interference pattern information of the reference light and the object light is recorded in by a digital image sensor and a computer reconstructs a shape of the measurement target object by using the recorded interference pattern information. The recorded interference pattern information is generally referred to as a hologram.

Meanwhile, in existing optical holographic technology other than the digital holographic technology, interference pattern information of the interference light and the object light is recorded on a special film, and when the reference light illuminates the special film where the interference pattern information is recorded to reconstruct a shape of the measurement target object, a virtual shape of the measurement target object is reconstructed at an original location of the measurement target object.

Compared with the existing optical holographic microscope, the digital holographic microscope is distinguished in that the image sensor measures and stores, in a digital manner, the interference pattern information, and the shape of the measurement target object is reconstructed by processing the stored interference pattern information via a numerical calculation method using a computer apparatus or the like, instead of an optical method.

In an existing digital holographic microscope, a laser light source of a single-wavelength is used. However, when the laser light source of a single-wavelength is used, measurement resolution, i.e., a smallest measurement unit, of an object is restricted to a wavelength of the laser light source. Also, when the existing digital holographic microscope uses a laser light source of two or multiple wavelengths, expenses may increase due to the use of light sources having different wavelengths, or it may be difficult to measure, in real time, 3-dimensional (3D) change information of an object to be measured due to sequential obtaining of holograms by using light sources having different wavelengths.

Also, in the existing digital holographic microscope, the computer generates a computer generated hologram (CGH) to reconstruct the shape of the measurement target object, the CGH is displayed on a spatial light modulator (SLM), and when the reference light illustrates the CGH, a 3D hologram of the measurement target object is obtained via diffraction of the reference light. At this time, expensive (at least tens of millions of won) SLM is required, and thus it is difficult to commercialize the existing digital holographic microscope.

One of methods for solving the above issues related to existing digital holographic technology is disclosed in, for example, KR 10-2016-0029606 (hereinafter, referred to as a "publicized prior art") publicized on Mar. 15, 2016 after being filed on Sep. 5, 2014 under KR 10-2014-0119395 with the title of Digital Holographic Microscopy and Method for Generating Digital Holographic Image by Eunsoo Kim et al.

FIG. 1 is a block diagram illustrating in detail a dual wavelength digital holographic microscopic apparatus according to the publicized prior art.

Referring to FIG. 1, the dual digital holographic microscopic apparatus of the publicized prior art includes a mixed light source 100, a wavelength splitter 200, an interference pattern obtainer 300, a nosepiece 400, an image sensor 500, an image storage unit 600, a controller 700, and an object shape reconstructor 800.

The mixed light source 100 includes a mixed light source emitter 110 and a light source lens 120. The mixed light source emitter 110 emits mixed light having a wavelength band distributed through various bands instead of a single band. The light source lens 120 optically adjusts the mixed light generated by the mixed light source emitter 110, and transmits the adjusted mixed light to the wavelength splitter 200.

The wavelength splitter 200 includes a first beam splitter 210, a first color filter 220, a second color filter 230, and a first reflector 240. The first beam splitter 210 receives the mixed light from the mixed light source 100 and splits the mixed light into two lights. Here, the first beam splitter 210 splits and transmits the mixed light in different directions.

The first color filter 220 obtains a first ray having a predetermined single-wavelength by receiving one of the lights split by the first beam splitter 210. Here, the light input to the first color filter 220 is filtered through the first color filter 220, and the first ray having the single-wavelength determined according to characteristics of the first color filter 220 is obtained. The second color filter 230 obtains a second ray having a wavelength different from that of the first ray by receiving the remaining one of the lights split by the first beam splitter 210, in the same manner as the first color filter 220. Also, the second ray is transmitted to the interference pattern obtainer 300. The first reflector 240 receives the first ray obtained by the first color filter 220, and reflects the first ray to the interference pattern obtainer 300.

The interference pattern obtainer 300 includes a second beam splitter 310, a third beam splitter 320, a second reflector 330, a third color filter 340, and a third reflector 350. The second beam splitter 310 receives the first ray from the wavelength splitter 200, and splits the first ray into a first object light and a first reference light. Here, the second beam splitter 310 splits and transmits the first ray to different directions. The third beam splitter 320 also receives the second ray and splits the second ray into a second object light and a second reference light in the same manner as the second beam splitter 310. The second reflector 330 receives the first reference light, and transmits a first reflected reference light in which the first reference light is reflected to the second beam splitter 31. The third color filter 340 receives the first reference light split by the second beam splitter 310 and transmits the first reference light to the second reflector 330, and receive the first reflected reference light and transmit the first reflected reference light to the second beam splitter 310. Also, the third color filter 340 prevents the second object light from reaching the second reflector 330 when the second object light is split at the second beam splitter 310 and transmitted to the second reflector 330. In this regard, the third color filter 340 is a color filter having the same characteristics as the first color filter 220 with respect to light transmission. The third reflector 350 receives the second reference light, and transmits a second reflected reference light in which the second reference light is reflected to the third beam splitter 320, and here, the second and third reflectors 330 and 350 may be configured such that angles are adjusted according to control of the controller 700, such that an off-axis hologram is realized.

The first and second object lights obtained as above are respectively converted into first and second reflected object lights through following processes, and then are transmitted to the image sensor 500. The second beam splitter 310 transmits the first object light split as such to a measurement target object loaded on the nosepiece 400, and the third beam splitter 320 transmits the second object light to the measurement target object. Here, reflected light of the first object light from the measurement target object is referred to as the first reflected object light. Also, reflected light of the second object light from the measurement target object is referred to as the second reflected object light. The second beam splitter 310 receives the first and second reflected object lights and transmits the first and second reflected object lights to the third beam splitter 320. The third beam splitter 320 transmits the first and second reflected object lights received as such to the image sensor 500 again.

Also, the first and second reflected reference lights obtained as such are transmitted to the image sensor 500 through following processes. In detail, the second beam splitter 310 receives the first reflected reference light reflected from the second reflector 330, and transmits the first reflected reference light to the third beam splitter 320. The third beam splitter 320 receives the first reflected reference light from the second beam splitter 310 and the second reflected reference light reflected from the third reflector 350, and transmits the first and second reflected reference lights to the image sensor 500 again. Accordingly, the first reflected object light, the first reflected reference light, the second reflected object light, and the second reflected reference light are all transmitted to the image sensor 500 from the third beam splitter 320, and then interfere with each other to generate an interference pattern.

Meanwhile, the second and third reflectors 330 and 350 are characterized in that the angles are adjustable in various directions according to control of the controller 700 so as to form an off-axis system in which rays of different wavelengths form different interference patterns. In other words, when the angles of the second and third reflectors 330 and 350 are different from each other, the first reflected reference light reflected from the second reflector 330 and the second reflected reference light reflected from the third reflector 350 are spaced apart from each other, and thus when the first and second reference lights combine with the first and second reflected object lights that reached the image sensor 500 to form interference patterns, off-axis interference patterns different according to wavelengths are formed.

The nosepiece 400 includes an object holder 410 and an objective lens 420. The object holder 410 fixes the measurement target object to a holder to be measured, and the objective lens 420 optically adjusts the first and second object lights incident on the measurement target object.

The image sensor 500 projects the interference patterns obtained by the interference pattern obtainer 300 on to a digital image sensor, measures the projected interference patterns by using the digital image sensor, and converts measured values to a discrete signal. Generally, a hologram is where the interference patterns are recorded. The digital image sensor may be any one of various image sensors, such as a charge-coupled device (CCD).

The image storage unit 600 stores the interference patterns converted into the discrete signal by the image sensor 500 in any one of various storage media, such as a memory and a disk apparatus.

In order to realize the off-axis system and obtain the interference patterns, the controller 700 controls the interference pattern obtainer 300 such that locations and angles of the second and third reflectors 330 and 350 are adjusted, and in order to adjust the first and second object lights incident on the measurement target object, the controller 700 controls the nosepiece 400 to adjust the objective lens 420, in order to convert the information about the interference patterns into the discrete signal, the controller 700 controls the image sensor 500, and in order to store the interference patterns converted into the discrete signal, the controller 700 controls the image storage unit 600.

The object shape reconstructor 800 includes a phase information obtainer 810, a thickness information obtainer 820, and a shape reconstructor 830. The phase information obtainer 810 obtains each of phase information of the interference pattern with respect to the first ray and phase information of the interference pattern with respect to the second ray by using the interference patterns, the thickness information obtainer 820 obtains thickness information of the measurement target object by using the phase information, and the shape reconstructor 830 reconstructs a real-time 3D shape of the measurement target object by using the thickness information. Here, the thickness information of the measurement target object includes difference information of paths of the first and second object lights and the first and second reference lights. Due to such an optical path difference of the first and second object lights and the first and second reference lights, the interference patterns are formed when the first and second object lights and the first and second reference lights overlap with each other.

In the publicized prior art, 3D shape information of the measurement target object is reconstructed in real time by increasing measurement resolution of the measurement target object, and measuring and recording holograms of the measurement target object in real time, the holograms changing according to time, but following issues still exist.

In detail, in the publicized prior art, since the mixed light source having wavelength bands distributed through several bands instead of a single band is used, so as to obtain at least two single-wavelengths, the first color filter 220, the second color filter 230, and the first reflector 240 are used for the wavelength splitter 200 to obtain the first and second rays having different wavelengths. Also, the interference pattern obtainer 300 additionally uses the third beam splitter 320 to split the second ray, the third reflector 350 to reflect the second ray, and the third color filter 340 to prevent the second ray from incident on the second reflector 330. Accordingly, an overall structure of the apparatus is complex, and manufacturing costs are still high.

Accordingly, a new apparatus that uses a light source of a single-wavelength while solving the above issues is required.

(Prior Art Documents)

(Patent Document 1) 1. KR 10-2016-0029606
(Patent Document 2) 2. KR 10-2010-0095302
(Patent Document 3) 3. KR 10-2012-0014355
(Patent Document 4) 4. KR 10-1139178
(Patent Document 5) 5. KR 10-1441245
(Patent Document 6) 6. U.S. Pat. No. 7,649,160

DESCRIPTION OF EMBODIMENTS

Technical Problem

Provided are an improved holographic reconstruction apparatus and method, which are capable of being applied to defect detecting apparatuses having a ultrafine structure, such as a thin-film transistor (TFT) and a semiconductor, medical devices that need to display a precise 3-dimensional (3D) image, and other detecting, determining, or displaying apparatuses in various fields including refractive index error detection of a transparent object, such as a lens, because the improved holographic reconstruction apparatus and method reconstruct 3D shape information and quantitative thickness information of an object by obtaining only one object hologram, digitally calculating and generating a reference hologram from the obtained object hologram, extracting an object phase of the object hologram and an object phase of the reference hologram, and calculating a difference between the object phases, and thus are able to solve issues related to a complex structure of an optical apparatus required during conventional one-shot-type digital holography reconstruction using one object hologram and consequent high costs, are able to perform holographic reconstruction using a simple structure and at a low cost, have general versatility of being applied to both conventional reflective and transmissive hologram reconstruction apparatuses, in particular, do not require reference light during hologram reconstruction, are able to reconstruct a quantitative 3D image of a measurement target object in real time.

Solution to Problem

According to an aspect of the present disclosure, a holographic reconstruction apparatus includes: a light source configured to emit single-wavelength light; a collimator configured to collimate the single-wavelength light emitted from the light source; a first beam splitter configured to split the single-wavelength light that has passed through the collimator into object light and reference light; an object light objective lens through which the object light obtained by the first beam splitter passes; a reference light objective lens through which the reference light obtained by the first beam splitter passes; an optic mirror reflecting the reference light that has passed through the reference light objective lens; a recording medium configured to record an interference pattern formed when the object light reflected by a surface of a measurement target object and the reference light reflected by the optic mirror pass through the object light objective lens and the reference light objective lens, respectively, and are transmitted to the first beam splitter; and a processor configured to receive and store an image file generated when the recording medium converts the interference pattern, wherein the processor is further configured to generate a digital reference hologram calculated from an object hologram obtained from the image file, and reconstruct 3-dimensional (3D) information of the measurement target object by calculating a phase information difference from first information of the object hologram and second information of the digital reference hologram.

According to another aspect of the present disclosure, a holographic reconstruction apparatus includes: a light source configured to emit single-wavelength light; a collimator configured to collimate the single-wavelength light emitted from the light source; a first beam splitter configured to split the single-wavelength light that has passed through the collimator into object light and reference light; an object light objective lens through which object penetration light including information about a measurement target object after the object light obtained by the first beam splitter passes through the measurement target object; a reference light objective lens through which the reference light obtained by the first beam splitter passes; a first optic mirror reflecting the reference light that passed through the reference light objective lens; a second optic mirror reflecting the object penetration light that passed through the object light objective lens; a second beam splitter to which the reference light reflected by the first optic mirror and the object penetration light reflected by the second optic mirror are transmitted; a recording medium configured to record an interference pattern formed by the reference light and the object penetration light, wherein the reference light and the object penetration light are transmitted to the second beam splitter; and a processor configured to receive and store an image file generated when the recording medium converts the interference pattern, wherein the processor is further configured to generate a digital reference hologram calculated from an object hologram obtained from the image file, and reconstruct 3-dimensional (3D) information of the measurement target object by calculating a phase information difference from first information of the object hologram and second information of the digital reference hologram.

According to another aspect of the present disclosure, a holographic reconstruction method includes: obtaining an object hologram of a measurement target object; generating a digital reference hologram calculated from the obtained object hologram; extracting each of a first phase information of the object hologram and a second phase information of the calculated digital reference hologram; calculating a phase information difference from the first phase information of the object hologram and the second phase information of the calculated digital reference hologram; and compensating for distorted phase information based on the calculated phase information difference, and calculating quantitative thickness information of the measurement target object by using the compensated distorted phase information to reconstruct 3-dimensional (3D) shape information and quantitative thickness information of the measurement target object.

Advantageous Effects of Disclosure

The following advantages are achieved when an improved holographic reconstruction apparatus and method according to the present disclosure are used.

Issues related to a complex structure of an optical apparatus required during conventional one-shot-type digital holography reconstruction using one object hologram and consequent high costs may be solved.

Also, holographic reconstruction may be performed by using a simple structure and at a low cost.

General versatility of being applied to both conventional reflective and transmissive hologram reconstruction apparatuses is exhibited.

In particular, reference light is not required during hologram reconstruction, and a quantitative 3D image of a measurement target object may be reconstructed in real time.

Also, the improved holographic reconstruction apparatus and method may be applied to defect detecting apparatuses having an ultrafine structure, such as a thin-film transistor (TFT) and a semiconductor, medical devices that need to display a precise 3-dimensional (3D) image, and other detecting, determining, or displaying apparatuses in various fields including refractive index error detection of a transparent object, such as a lens.

Additional advantages of the present disclosure will be more apparent from the following description taken in conjunction with the accompanying drawings, in which like reference numerals denote like elements.

BEST MODE

Hereinafter, the present disclosure will be described in detail with reference to embodiments and drawings.

Figure 1:
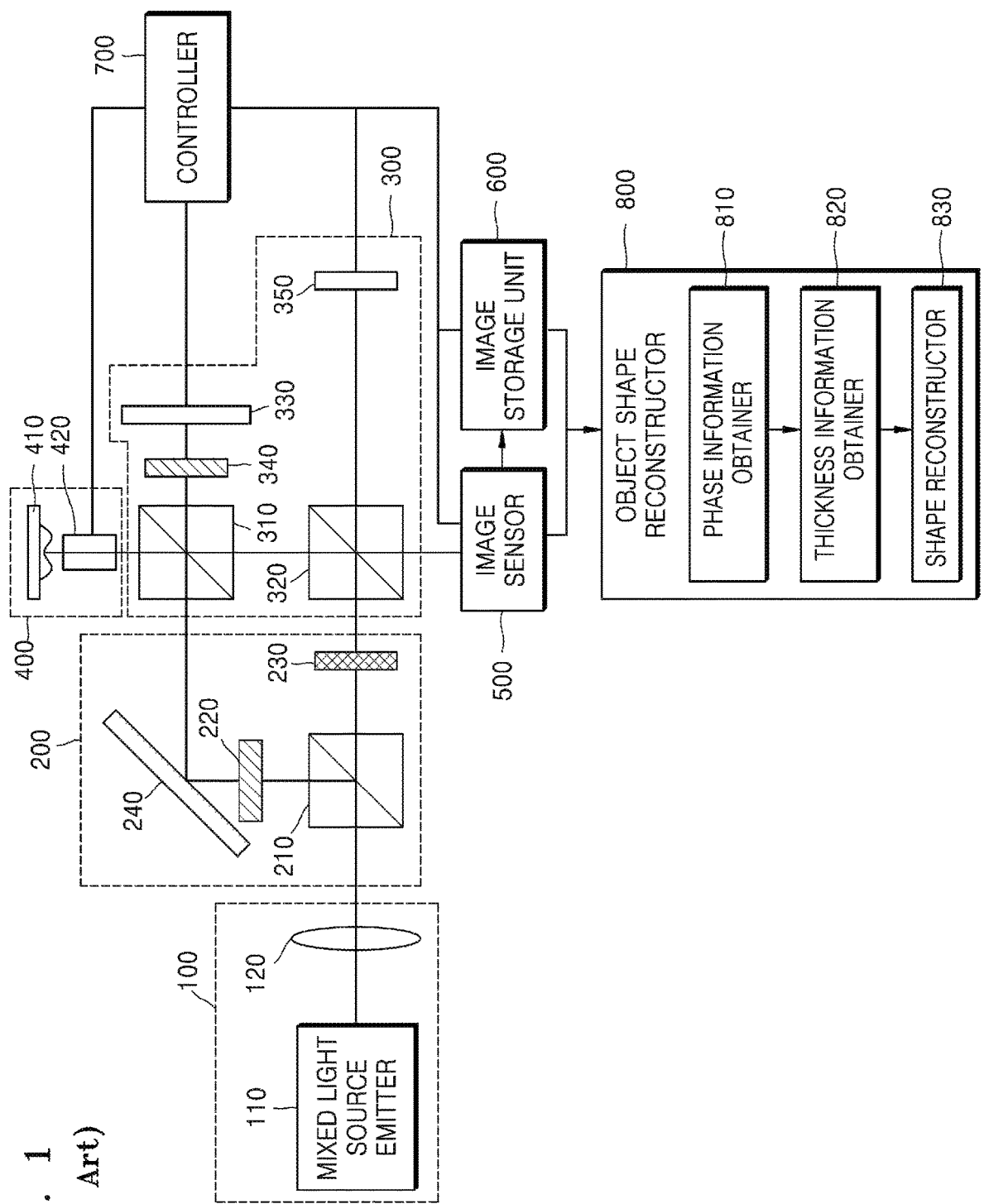
FIG. 1 is a block diagram illustrating in detail a dual wavelength digital holographic microscopic apparatus according to the published prior art.
Figure 2A:
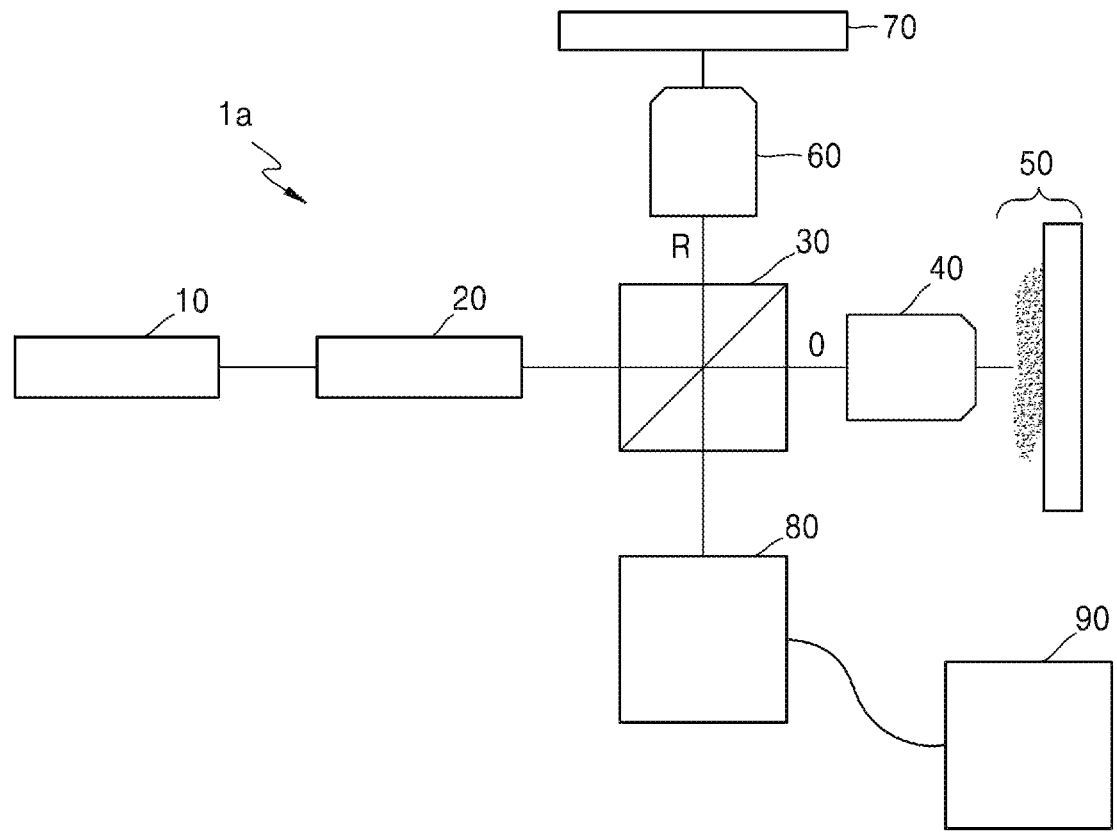
FIG. 2A is a block diagram of a holographic reconstruction apparatus according to a first embodiment of the present disclosure.

FIG. 2A is a block diagram of a holographic reconstruction apparatus according to a first embodiment of the present disclosure.

Referring to FIG. 2A, a holographic reconstruction apparatus 1a according to the first embodiment of the present disclosure includes: a light source 10 configured to emit a single-wavelength light; a collimator 20 configured to collimate the single-wavelength light emitted from the light source 10; a first beam splitter 30 configured to split the single-wavelength light that has passed through the collimator 20 into object light O and reference light R; an object light objective lens 40 through which the object light O obtained by the first beam splitter 30 passes; a reference light objective lens 60 through which the reference light R obtained by the first beam splitter 30 passes; an optic mirror 70 reflecting the reference light R that has passed through the reference light objective lens 60; a recording medium 80 configured to record an interference pattern formed when the object light O reflected by a surface of a measurement target object 50 and the reference light R reflected by the optic mirror 70 pass through the object light objective lens 40 and the reference light object lens 60, respectively, and are transmitted to the first beam splitter 30; and a processor 90 configured to receive and store an image file generated when the recording medium 80 converts the interference pattern, wherein the processor 90 is further configured to generate a digital reference hologram calculated from an object hologram obtained from the image file, and reconstruct 3-dimensional (3D) information of the measurement target object 50 by calculating a phase information difference from first information of the object hologram and second information of the digital reference hologram.

Figure 2B:
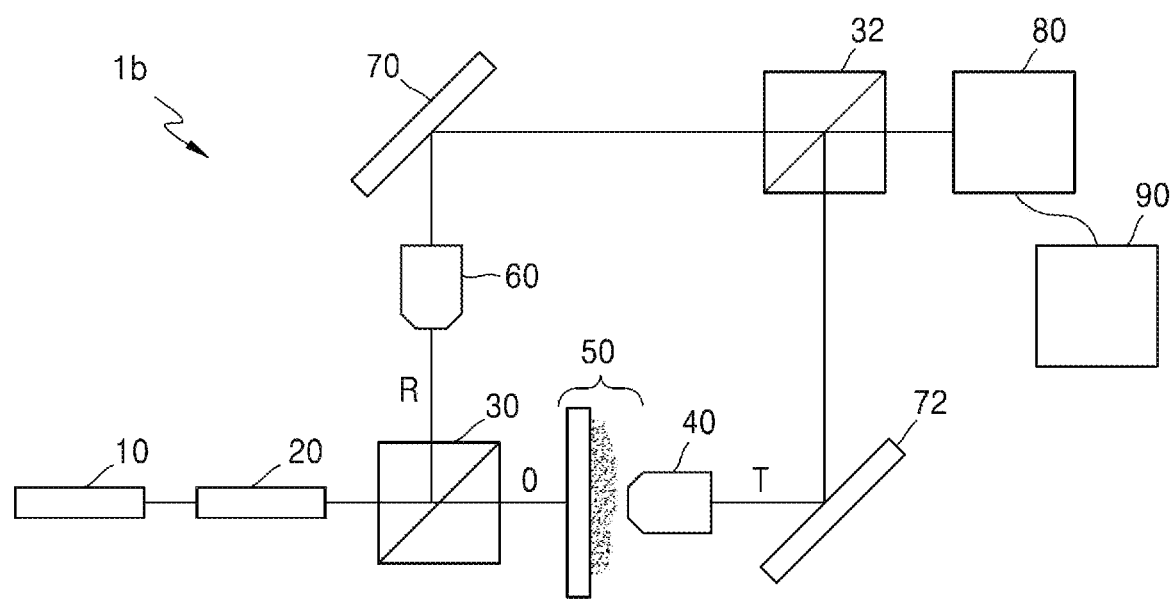
FIG. 2B is a block diagram of a holographic reconstruction apparatus according to a second embodiment of the present disclosure.

FIG. 2B is a block diagram of a holographic reconstruction apparatus according to a second embodiment of the present disclosure.

Referring to FIG. 2B, a holographic reconstruction apparatus 1b according to the second embodiment of the present disclosure includes: the light source 10 configured to emit a single-wavelength light; the collimator 20 configured to collimate the single-wavelength light emitted from the light source 10; the first beam splitter 30 configured to split the single-wavelength light that has passed through the collimator 20 into the object light O and the reference light R; the reference light objective lens 60 through which the reference light R obtained by the first beam splitter 30 passes; a first optic mirror 70 reflecting the reference light R that passed through the reference light objective lens 60; the object light objective lens 40 through which object penetration light T including information about the measurement target object 50 passes after the object light O obtained by the first beam splitter 30 passes through the measurement target object 50; a second optic mirror 72 reflecting the object penetration light T that passed through the object light objective lens 40; a second beam splitter 32 to which the reference light R reflected by the first optic mirror 70 and the object penetration light T reflected by the second optic mirror 72 are transmitted; the recording medium 80 configured to record an interference pattern formed by the reference light R and the object penetration light T, which are transmitted to the second beam splitter 32; and the processor 90 configured to receive and store an image file generated when the recording medium 80 converts the interference pattern, wherein the processor 90 is further configured to generate a digital reference hologram calculated from an object hologram obtained from the image file, and reconstruct 3-dimensional (3D) information of the measurement target object 50 by calculating a phase information difference from first information of the object hologram and second information of the digital reference hologram.

The holographic reconstruction apparatus 1a according to the first embodiment of the present disclosure and the holographic reconstruction apparatus 1b according to the second embodiment of the present disclosure respectively shown in FIGS. 2A and 2B substantially have the same structure except that the object light O is reflected by the measurement target object 50 (the embodiment of FIG. 2A) or the object light O passes through the measurement target object 50 (the embodiment of FIG. 2B), and thus some components (for example, the second optic mirror 72 and the second beam splitter 32 in the embodiment of FIG. 2B) are additionally used and arranged, and in particular, have the same characteristics in that the interference pattern is recorded on the recording medium 80 and the digital reference hologram is calculated from the object hologram obtained by the processor 90 in a form of the image file based on the recorded interference pattern. Accordingly, hereinafter, the holographic reconstruction apparatuses 1a and 1b according to the first and second embodiments of the present disclosure will be collectively referred to as a holographic reconstruction apparatus 1 according to an embodiment of the present disclosure.

The processor 90 of the holographic reconstruction apparatus 1 according to the embodiment of the present disclosure may be, for example, an apparatus capable of arithmetic calculation, such as a microprocessor or a personal computer (PC), and the recording medium 80 may be an image sensor, such as a charge coupled device (CCD) or a complementary metal-oxide semiconductor (CMOS).

Also, information of the object hologram obtained by the processor 90 of the holographic reconstruction apparatus 1 according to the embodiment of the present disclosure includes a wavelength, an interference angle, an object phase, and a curvature aberration of the object light objective lens 40, and may additionally include noise.

Also, the object hologram obtained by the processor 90 of the holographic reconstruction apparatus 1 according to the current embodiment of the present disclosure is a complex conjugation hologram, and may be represented by Equation 1 below.

$$|U_c(x,y,0)|^2 = |O(x,y)|^2 + |R(x,y)|^2 + O^*(x,y)R(x,y) + O(x,y)R^*(x,y)$$ (Equation 1)

In Equation 1, x and y denote spatial coordinates, $U0(x,y,O)$ denotes the obtained object hologram, $O(x,y)$ and $R(x,y)$ respectively denote the object light O and the reference light R, and $O^*(x,y)$ and $R^*(x,y)$ respectively denote complex conjugations of the object light O and the reference light R.

Hereinafter, a detailed method of generating the digital reference hologram calculated from the obtained object hologram is described.

First, the processor 90 of the holographic reconstruction apparatus 1 according to the embodiment of the present disclosure obtains the object hologram (see a semiconductor substrate circuit of FIG. 2C) from the image file of the interference pattern recorded on the recording medium 80. Then, the processor 90 detects an edge of the obtained object hologram by using an edge detection algorithm (see an edge shown in FIG. 2D). Examples of the edge detection algorithm include well-known Sobel, Prewitt, Roberts, Zero-cross, Canny algorithms, and other well-known edge detection algorithms.

Next, an angle (hereinafter, referred to as an "edge angle") of the detected edge tilted based on a vertical line is extracted from the object hologram from which the edge is detected, by using Hough transform. Then, an interference incidence angle of object light and reference light of the calculated digital reference hologram is calculated by using an average value of the extracted angle of the edge.

Then, 2D Fourier transform is performed by using the obtained object hologram. A frequency spectrum of the object hologram obtained via 2D Fourier transform is shown discretely into a real image, an imaginary image, and direct current (DC) information. Here, a real image spot-position is extracted by using an automatic real image spot-position extraction algorithm. A wavenumber vector constant of the calculated digital reference hologram is calculated by using the extracted real image spot-position and a wavenumber algorithm (see FIG. 2E).

Then, curvature aberration information is extracted from the object hologram to compensate for a curvature aberration of the object light objective lens 40 used to measure the object hologram. Then, a factor compensating for the extracted curvature aberration information by using an automatic frequency curvature compensation algorithm is added to the calculated digital reference hologram. The calculated digital reference hologram in which the curvature aberration information is compensated for may be represented by Equation 2 below.

$$U_{DR}(x,y,0) = R_D(x,y) + R_C(x,y)$$ (Equation 2)

In Equation 2, $U_{DR}(x,y,O)$ denotes the calculated digital reference hologram, and $RD(x,y)$ and $RC(x,y)$ respectively denote an information factor of light of the object hologram and a factor compensating for the extracted curvature aberration information.

Then, the processor 90 converts the obtained object hologram and the calculated digital reference hologram to information of a reconstructed image plane by using a respective angular spectrum propagation algorithm. Here, the reconstructed image plane denotes a virtual image display plane at a location corresponding to a distance between the measurement target object 50 and the recording medium 80, and may be calculated and simulated by the processor 90. The processor 90 extracts phase information of the converted object hologram and the calculated digital reference hologram through inverse 2D Fourier transform. The phase information of the object hologram extracted as such includes an object phase of the measurement target object 50, curvature aberration information of the object light objective lens 40, and recorded light information (for example, a wavelength and an interference angle), and the phase information of the calculated digital reference hologram includes the curvature aberration information of the object light objective lens 40 and the recorded light information.

Then, in order to obtain only phase information of an object, the processor 90 calculates a difference between the phase information of the extracted object hologram and the phase information of the calculated digital reference hologram. At this time, the processor 90 compensates for distorted phase information based on the calculated difference by using a 2D phase unwrapping algorithm, and calculates quantitative thickness information of the measurement target object 50 by using the compensated phase information. The quantitative thickness information of the measurement target object 50 calculated by the processor 90 is represented by Equation 3 below.

$$\Delta L = \frac{\lambda \Delta \Phi(x, y)}{2\pi \Delta n(x, y)} \quad \text{(Equation 3)}$$

In Equation 3, $\Delta L$ denotes the quantitative thickness information of the measurement target object 50, $\lambda$ denotes a wavelength of the light source 10 used to obtain the object hologram, $\Delta \varphi(x,y)$ denotes phase difference information between the object hologram and the calculated digital reference hologram, and $\Delta n(x,y)$ denotes a refractive index difference between the background (or air) and the measurement target object 50. The processor 90 reconstructs a 3D shape of the measurement target object 50 on the reconstructed image plane by using the quantitative thickness information of the measurement target object 50 calculated according to Equation 3. The reconstructed image plane reconstructed by the processor 90 may be displayed, for example, on a separate monitor (not shown).

Figure 2C:
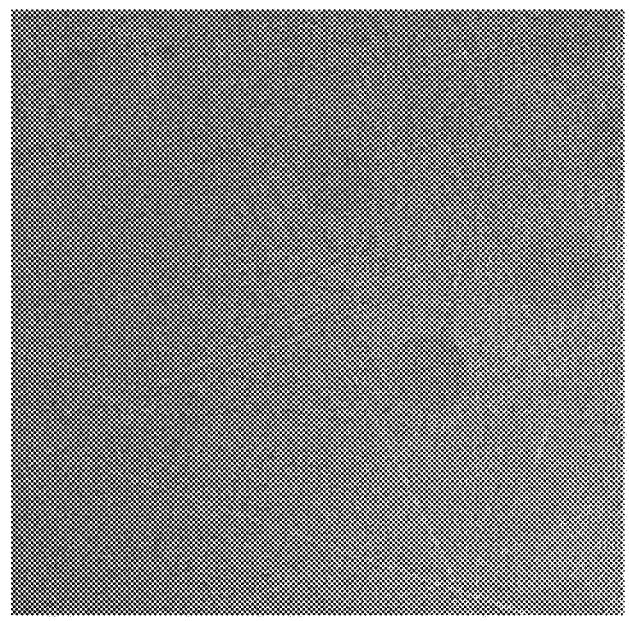
FIG. 2C is a view of an object hologram of a semiconductor substrate circuit, according to an embodiment of the present disclosure.
Figure 2D:
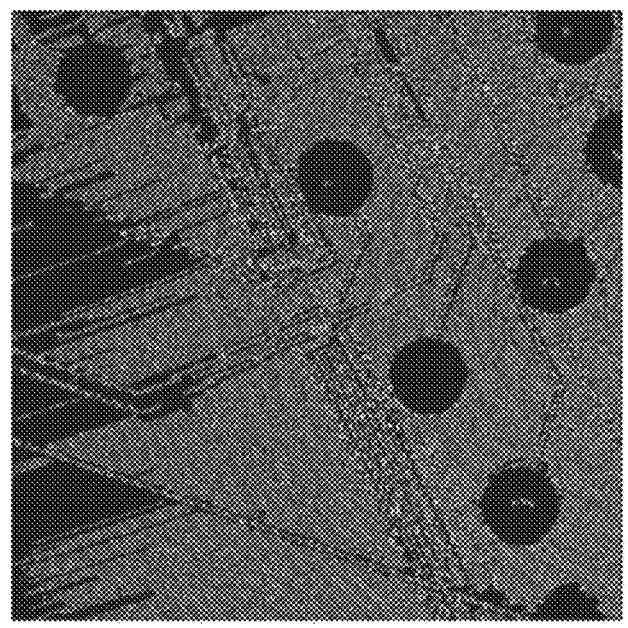
FIG. 2D is a view illustrating an edge detected from the object hologram of the semiconductor substrate circuit of FIG. 2C, according to an embodiment of the present disclosure, by using an edge detection algorithm.
Figure 2E:
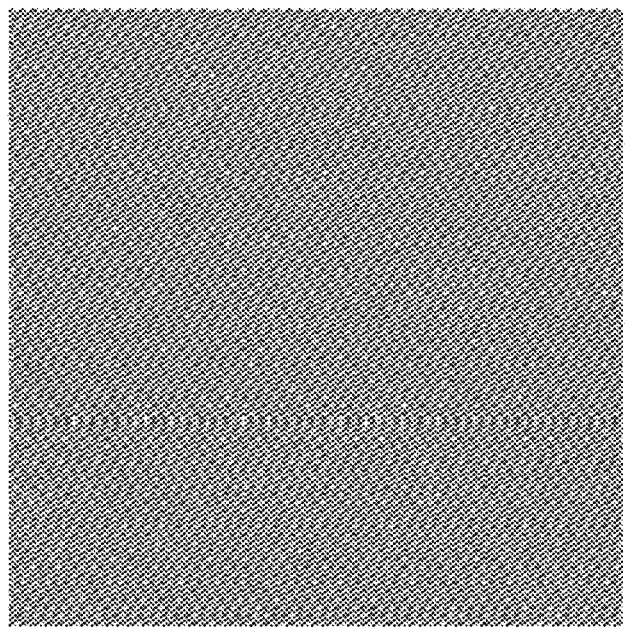
FIG. 2E is a view obtained by calculating a wavenumber vector constant of a reference hologram calculated by using a wavenumber algorithm and a real image spot-position extracted, by using an automatic real image spot-position extraction algorithm, from a frequency spectrum of an object hologram obtained via 2-dimensional (2D) Fourier Transform.
Figure 2F:
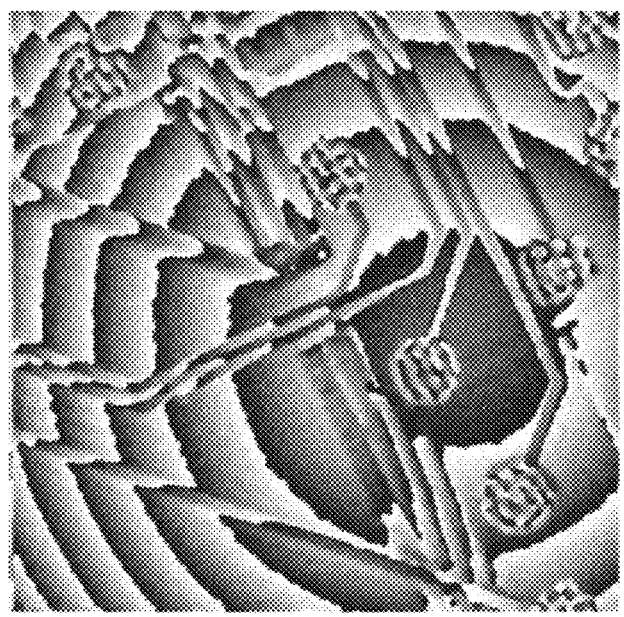
FIG. 2F is a view of a reconstructed image of a 3-dimensional (3D) shape of a measurement target object on which curvature aberration correction of an object light objective lens is not performed.
Figure 2G:
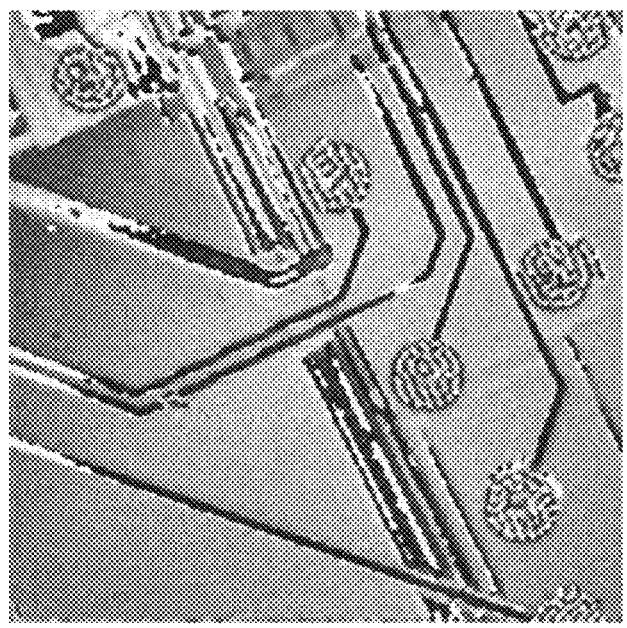
FIG. 2G is a view of a reconstructed image of a 3D shape of the measurement target object on which curvature aberration correction of the object light objective lens is performed.

FIGS. 2F and 2G are views of a reconstructed image of a 3D shape of the measurement target object 50 on which curvature aberration correction of the object light objective lens 40 is not performed, and a reconstructed image of a 3D shape of the measurement target object 50 on which curvature aberration correction of the object light objective lens 40 is performed. Referring to the reconstructed image of FIG. 2G, it is determined that the 3D shape of the semiconductor substrate circuit of FIG. 2C is clearly reconstructed.

Figure 3A:
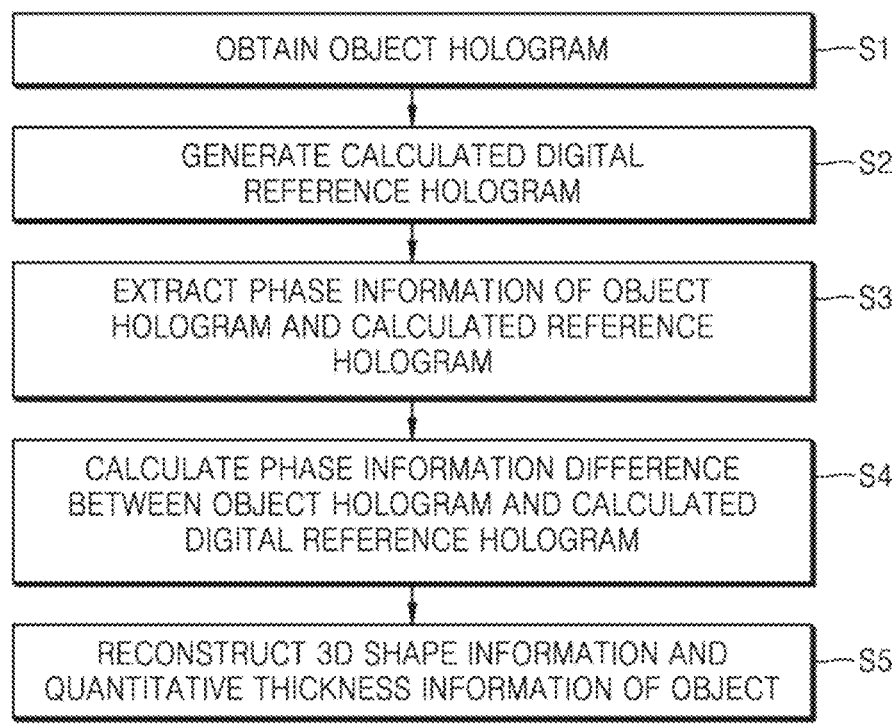
FIG. 3A is a flowchart of a holographic reconstruction method according to an embodiment of the present disclosure.
Figure 3B:
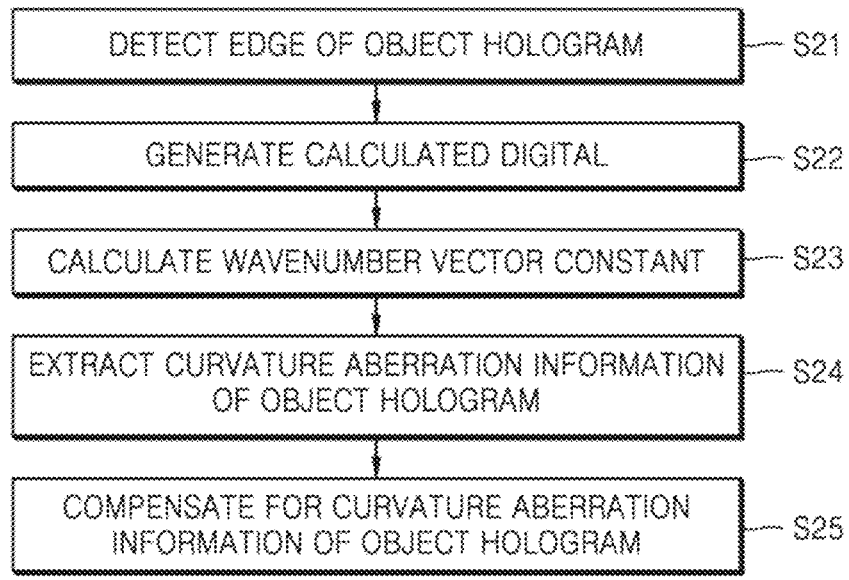
FIG. 3B is a flowchart of detailed operations of operation S2 in the holographic reconstruction method of FIG. 3A, according to an embodiment of the present disclosure.

FIG. 3A is a flowchart of a holographic reconstruction method according to an embodiment of the present disclosure, and FIG. 3B is a flowchart of a detailed operation of operation S2 in the holographic reconstruction method of FIG. 3, according to an embodiment of the present disclosure.

Referring to FIGS. 3A and 3B together with FIGS. 2A through 2G, the holographic reconstruction method according to an embodiment of the present disclosure includes: obtaining the object hologram of the measurement target object 50, in operation S1; generating the digital reference hologram calculated from the obtained object hologram, in operation S2; extracting each of the first phase information of the object hologram and the second phase information of the calculated digital reference hologram, in operation S3; calculating the phase information difference from the first phase information of the object hologram and the second phase information of the calculated digital reference hologram, in operation S4; and compensating for the distorted phase information based on the calculated phase information difference, and calculating the quantitative thickness information of the measurement target object 50 by using the compensated distorted phase information to reconstruct the 3D) shape information and the quantitative thickness information of the measurement target object 50, in operation S5.

In the holographic reconstruction method according to an embodiment of the present disclosure, operation S1 may include: splitting, by the first beam splitter 30, the single-wavelength light emitted from the light source 10 into the object light O and the reference light R; reflecting the object light O from a surface of the measurement target object 50 through the object light objective lens 40, and reflecting the reference light R at an optic mirror 70 after passing the reference light R through the reference light objective lens 60; recording the interference pattern formed when the reflected object light O and the reflected reference light R are transmitted to the first beam splitter 30 on the recording medium 80, and transmitting, to the processor 90, the image file generated by converting the interference pattern; and obtaining, by the processor 90, the object hologram from the image file.

Alternatively, in the holographic reconstruction method according to an embodiment of the present disclosure, operation S1 may include: splitting, by the first beam splitter 30, the single-wavelength light emitted from the light source 10 into the object light O and the reference light R; reflecting the object penetration light T obtained by passing the object light O through the measurement target object 50 at the second optic mirror 72 after passing the object penetration light T through the object light objective lens 40, and reflecting the reference light R at the optical mirror 70 after passing the reference light R through the reference light objective lens 60; recording the interference pattern formed by transmitting the reflected object penetration light T and the reflected reference light R to the second beam splitter 32, on the recording medium 80, and transmitting the image file generated by converting the interference pattern to the processor 90; and obtaining, by the processor 90, the object hologram from the image file.

Also, in the holographic reconstruction method according to an embodiment of the present disclosure, operation S2 may include: detecting the edge of the obtained object hologram by using an edge detection algorithm, in operation S21; extracting the angle of the edge, which is an angle of the detected edge tilted based on a vertical line, by using Hough transform, and then calculating the interference incidence angle of the object light and the reference light of the calculated digital reference hologram by using an average value of the extracted angle of the edge, in operation S22; extracting, by using an automatic real image spot-position extraction algorithm, the real image spot-position from the frequency spectrum of the object hologram obtained via 2D Fourier transform by using the obtained object hologram, and then calculating the wavenumber vector constant of the calculated digital reference hologram by using the extracted real image spot-position and a wavenumber algorithm, in operation S23; extracting the curvature aberration information from the object hologram to compensate for the curvature aberration of the object light objective lens 40 used to measure the object hologram, in operation S24; and generating the calculated digital reference hologram by compensating for the extracted curvature aberration information by using an automatic frequency curvature aberration compensation algorithm, in operation S25. The calculated digital reference hologram generated in operation S25 is represented by an equation UDR(x,y,O)=RD(x,y)+RC(x,y), wherein UDR(x,y,O) denotes the calculated digital reference hologram, and RD(x,y) and RC(x,y) are respectively the information factor of the object hologram and the factor compensating for the extracted curvature aberration information.

Also, operation S3 may include: converting the obtained object hologram and the calculated digital reference hologram to information of the reconstructed image plane by using a respective angular spectrum propagation algorithm; and extracting the phase information of the object hologram and the phase information of the calculated digital reference hologram by performing inverse 2D Fourier transform on the converted object hologram and the converted digital reference hologram. Here, the phase information of the object hologram includes the object phase of the measurement target object 50, the curvature aberration information of the object light objective lens 40, and the recorded light information, and the phase information of the calculated digital reference hologram includes the curvature aberration information of the object light objective lens 40 used to measure the object hologram, and the recorded light information.

Also, in operation S5, the quantitative thickness information is represented by an equation: $\Delta L = \lambda \Delta \varphi(x,y)/2\pi \Delta n(x,y)$, wherein $\Delta L$ denotes the quantitative thickness information of the measurement target object 50, $\lambda$ denotes the wavelength of the light source 10 used to obtain the object hologram, $\Delta \varphi(x,y)$ denotes the phase difference information between the object hologram and the calculated digital reference hologram, and $\Delta n(x,y)$ denotes the difference in refractive index between air and the measurement target object 50.

INDUSTRIAL APPLICABILITY

As described above, in the improved holographic reconstruction apparatus 1 and method according to the present disclosure, since the processor 90 directly generates the calculated digital reference hologram from the object hologram to reconstruct 3D information of the measurement target object 50, issues related to a complex structure of an optical apparatus required during conventional one-shot-type digital holography reconstruction using one object hologram and consequent high costs may be solved.

Also, in the improved holographic reconstruction apparatus 1 and method according to the present disclosure, since the holographic reconstruction apparatus 1 additionally uses only the processor 90, an overall structure is very simple and a hologram may be reconstructed at a low cost.

Also, in the improved holographic reconstruction apparatus 1 and method according to the present disclosure, since the holographic reconstruction apparatus 1 substantially has the same structure as conventional reflective and transmissive hologram reconstruction apparatuses except for the processor 90, the improved holographic reconstruction apparatus 1 and method have general versatility of being applied to both the conventional reflective and transmissive hologram reconstruction apparatuses.

Also, in the improved holographic reconstruction apparatus 1 and method according to the present disclosure, in particular, reference light is not required during hologram reconstruction, and a quantitative 3D image of the measurement target object 50 may be reconstructed in real time.

Also, in the improved holographic reconstruction apparatus 1 and method according to the present disclosure, since the quantitative 3D image of the measurement target object 50 may be reconstructed in real time without having to use the reference light, the improved holographic reconstruction apparatus 1 and method may be applied to defect detecting apparatuses having a ultrafine structure, such as a thin-film transistor (TFT) and a semiconductor, medical devices that need to display a precise 3-dimensional (3D) image, and other detecting, determining, or displaying apparatuses in various fields including refractive index error detection of a transparent object, such as a lens.

While one or more embodiments have been described with reference to the figures, it will be understood by those of ordinary skill in the art that various changes in form and details may be made therein without departing from the spirit and scope as defined by the following claims.

The invention claimed is:

1. A holographic reconstruction apparatus comprising:
    a light source configured to emit single-wavelength light;
    a collimator configured to collimate the single-wavelength light emitted from the light source;
    a first beam splitter configured to split the single-wavelength light that has passed through the collimator into object light and reference light;
    an object light objective lens through which the object light obtained by the first beam splitter passes;
    a reference light objective lens through which the reference light obtained by the first beam splitter passes;
    an optic mirror reflecting the reference light that has passed through the reference light objective lens;
    a recording medium configured to record an interference pattern formed when the object light reflected by a surface of a measurement target object and the reference light reflected by the optic mirror pass through the object light objective lens and the reference light objective lens, respectively, and are transmitted to the first beam splitter; and
    a processor configured to receive and store an image file generated when the recording medium converts the interference pattern,
    wherein the processor is further configured to generate a digital reference hologram calculated from an object hologram obtained from the image file, and reconstruct 3-dimensional (3D) information of the measurement target object by calculating a phase information difference from first information of the object hologram and second information of the digital reference hologram.

2. The holographic reconstruction apparatus of claim 1, wherein the processor is further configured to generate the digital reference hologram by:
    detecting an edge of the obtained object hologram;
    extracting an angle of the edge, which is an angle of the detected edge tilted based on a vertical line, and calculating an interference incidence angle of the object light and the reference light of the calculated digital reference hologram by using an average value of the extracted angle of the edge;
    extracting a real image spot-position from a frequency spectrum of the object hologram obtained via 2-dimensional (2D) Fourier transform by using the obtained object hologram, and then calculating a wavenumber vector constant of the calculated digital reference hologram by using the extracted real image spot-position and a wavenumber algorithm; and
    extracting curvature aberration information of the object light objective lens from the object hologram, and compensating for the extracted curvature aberration information.

3. The holographic reconstruction apparatus of claim 1, wherein the calculated digital reference hologram is represented by an equation: UDR(x,y,O)=RD(x,y)+RC(x,y), wherein UDR(x,y,O) denotes the calculated digital reference hologram, and RD(x,y) and RC(x,y) are respectively an information factor of the object hologram and a factor compensating for the extracted curvature aberration information.

4. The holographic reconstruction apparatus of claim 3, wherein a phase information of the object hologram comprises an object phase of the measurement target object, curvature aberration information of the object light objective lens, and recorded light information, and
  a phase information of the calculated digital reference hologram comprises the curvature aberration information of the object light objective lens and the recorded light information.

5. The holographic reconstruction apparatus of claim 1, wherein the processor is further configured to convert the obtained object hologram and the calculated digital reference hologram to information of a reconstructed image plane, and extract phase information of the object hologram and phase information of the calculated digital reference hologram by performing inverse 2D Fourier Transform on the converted object hologram and the converted digital reference hologram.

6. The holographic reconstruction apparatus of claim 1, wherein quantitative thickness information of the measurement target object is represented by an equation: $\Delta L = \lambda \Delta \varphi(x,y)/2\pi\Delta n(x,y)$, wherein $\Delta L$ denotes the quantitative thickness information of the measurement target object, $\lambda$ denotes a wavelength of the light source, $\Delta \varphi(x,y)$ denotes phase difference information between the object hologram and the calculated digital reference hologram, and $\Delta n(x,y)$ denotes a difference in refractive index between air and the measurement target object.

7. A holographic reconstruction apparatus comprising:
  a light source configured to emit single-wavelength light;
    a collimator configured to collimate the single-wavelength light emitted from the light source;
    a first beam splitter configured to split the single-wavelength light that has passed through the collimator into object light and reference light;
    an object light objective lens through which object penetration light including information about a measurement target object after the object light obtained by the first beam splitter passes through the measurement target object;
    a reference light objective lens through which the reference light obtained by the first beam splitter passes;
    a first optic mirror reflecting the reference light that passed through the reference light objective lens;
    a second optic mirror reflecting the object penetration light that passed through the object light objective lens;
    a second beam splitter to which the reference light reflected by the first optic mirror and the object penetration light reflected by the second optic mirror are transmitted;
    a recording medium configured to record an interference pattern formed by the reference light and the object penetration light, wherein the reference light and the object penetration light are transmitted to the second beam splitter; and
    a processor configured to receive and store an image file generated when the recording medium converts the interference pattern, wherein the processor is further configured to generate a digital reference hologram calculated from an object hologram obtained from the image file, and reconstruct 3-dimensional (3D) information of the measurement target object by calculating a phase information difference from first information of the object hologram and second information of the digital reference hologram.

8. A holographic reconstruction method comprising:
  obtaining an object hologram of a measurement target object;
  generating a digital reference hologram calculated from the obtained object hologram;
  extracting each of a first phase information of the object hologram and a second phase information of the calculated digital reference hologram;
  calculating a phase information difference from the first phase information of the object hologram and the second phase information of the calculated digital reference hologram; and
  compensating for distorted phase information based on the calculated phase information difference, and calculating quantitative thickness information of the measurement target object by using the compensated distorted phase information to reconstruct 3-dimensional (3D) shape information and quantitative thickness information of the measurement target object.

9. The holographic reconstruction method of claim 8, wherein the obtaining of the object hologram comprises:
  splitting, by a first beam splitter, single-wavelength light emitted from a light source into object light and reference light;
  reflecting the object light from a surface of the measurement target object through an object light objective lens, and reflecting the reference light off an optic mirror after passing the reference light through a reference light objective lens;
  recording, on a recording medium, an interference pattern formed when the reflected object light and the reflected reference light are transmitted to the first beam splitter, and transmitting, to a processor, an image file generated by converting the interference pattern; and
  obtaining, by the processor, the object hologram from the image file.

10. The holographic reconstruction method of claim 8, wherein the obtaining of the object hologram comprises:
  splitting, by a first beam splitter, single-wavelength light emitted from a light source into object light and reference light;
  reflecting an object penetration light, which is obtained by passing the object light through the measurement target object, from a second optic mirror after passing the object penetration light through an object light objective lens, and reflecting the reference light from an optic mirror after passing the reference light through a reference light objective lens;
  recording, on a recording medium, an interference pattern formed by transmitting the reflected object penetration light and the reflected reference light to a second beam splitter, and transmitting an image file generated by converting the interference pattern to a processor; and
  obtaining, by the processor, the object hologram from the image file.

11. The holographic recognition method of claim 8, wherein the generating of the digital reference hologram comprises:

detecting an edge of the obtained object hologram by using an edge detection algorithm;

extracting an angle of the edge, which is an angle of the detected edge tilted based on a vertical line, by using Hough transform, and then calculating an interference incidence angle of the object light and the reference light of the calculated digital reference hologram by using an average value of the extracted angle of the edge;

extracting, by using an automatic real image spot-position extraction algorithm, a real image spot-position from a frequency spectrum of the object hologram obtained via 2-dimensional (2D) Fourier transform by using the obtained object hologram, and then calculating a wavenumber vector constant of the calculated digital reference hologram by using the extracted real image spot-position and a wavenumber algorithm;

extracting curvature aberration information from the object hologram to compensate for a curvature aberration of an object light objective lens used to measure the object hologram; and generating the calculated digital reference hologram by compensating for the extracted curvature aberration information by using an automatic frequency curvature aberration compensation algorithm.

12. The holographic reconstruction method of claim 11, wherein the calculated digital reference hologram generated in the generating of the calculated digital reference hologram by compensating for the extracted curvature aberration information is represented by an equation $UDR(x,y,O)=RD(x,y)+RC(x,y)$, wherein $UDR(x,y,O)$ denotes the calculated digital reference hologram, and $RD(x,y)$ and $RC(x,y)$ are respectively an information factor of the object hologram and a factor compensating for the extracted curvature aberration information.

13. The holographic reconstruction method of claim 8, wherein the extracting of each of the phase information of the object hologram and the phase information of the calculated digital reference hologram comprises:

converting the obtained object hologram and the calculated digital reference hologram to information of a reconstructed image plane by using a respective angular spectrum propagation algorithm; and extracting phase information of the object hologram and phase information of the calculated digital reference hologram by performing inverse 2D Fourier transform on the converted object hologram and the converted digital reference hologram.

14. The holographic reconstruction method of claim 13, wherein the phase information of the object hologram comprises an object phase of the measurement target object, curvature aberration information of an object light objective lens, and recorded light information, and the phase information of the calculated digital reference hologram comprises the curvature aberration information of the object light objective lens used to measure the object hologram, and the recorded light information.

15. The holographic reconstruction method of claim 8, wherein the quantitative thickness information is represented by an equation: $\Delta L=\lambda\Delta\varphi(x,y)/2\pi\Delta n(x,y)$, wherein $\Delta L$ denotes the quantitative thickness information of the measurement target object, $\lambda$ denotes a wavelength of a light source used to obtain the object hologram, $\Delta\varphi(x,y)$ denotes phase difference information between the object hologram and the calculated digital reference hologram, and $\Delta n(x,y)$ denotes a difference in refractive index between air and the measurement target object.

* * * * *